Sept. 22, 1959 A. R. CLARK ET AL 2,905,340
APPARATUS FOR RECEIVING TUBES AND LOADING THEM INTO RACKS
Filed Dec. 3, 1956 3 Sheets-Sheet 1

INVENTORS
ALBERT R. CLARK
WILLIAM B. CLARK
BY
W. P. Carr
ATTORNEY

Sept. 22, 1959     A. R. CLARK ET AL     2,905,340
APPARATUS FOR RECEIVING TUBES AND LOADING THEM INTO RACKS
Filed Dec. 3, 1956     3 Sheets-Sheet 3

INVENTORS
ALBERT R. CLARK
BY WILLIAM B. CLARK
W. P. Carr
ATTORNEY

United States Patent Office 2,905,340
Patented Sept. 22, 1959

2,905,340

APPARATUS FOR RECEIVING TUBES AND LOADING THEM INTO RACKS

Albert R. Clark and William B. Clark, Perrysburg, Ohio

Application December 3, 1956, Serial No. 625,844

8 Claims. (Cl. 214—6)

This invention relates to an apparatus for receiving a continuous succession of tubes, bar stock or other elongated articles and loading such articles into storage and conveying racks.

The apparatus of this invention is particularly adapted to handling tubes in high quantity in plants devoted to automobile production.

In such plants the volume of tubular products involved has made it economically desirable to install tube forming mills and supplemental equipment for cutting, swaging and otherwise preparing the tubing for its ultimate use, the latter comprising such items as shock absorber cylinders, drive shafts and steering column masts.

In the fabrication of tubes it is frequently necessary to build up and maintain a transitional stock of unfinished tubing between operational steps and also of the completed tubes ready for delivery to an assembly line. The expeditious handling and storing of such stocks has presented a difficult problem.

Too frequently in manufacturing plants savings obtained through modern production facilities are not fully realized due to the cost of the labor and the space required in handling and storage of parts in process. This is more likely to be the case when items of cumbersome size and shape are involved such as tubular articles produced in automobile plants.

It is the prime purpose of this invention to solve this problem by providing an apparatus which receives tubes continuously discharged from a fabricating machine and delivers the tubes to a storage and conveying rack.

Another object of the invention is the provision of an apparatus which automatically withholds tubes when the rack is filled and promptly resumes delivery of the tubes as soon as the filled rack has been replaced with an empty rack.

A further object of the invention is to provide an apparatus with means for locking the rack in place until it is filled and then immediately releasing the rack.

Another object is the provision of an apparatus which handles tubes smoothly, orderly and without jarring or injurious contact.

These and other objects and advantages of the invention which will be apparent upon consideration of the following description are attained by the provision of an apparatus having a runway for receiving a continuous succession of tubes, belt means slowly lowered to hold the increasing accumulation of tubes, and means releasing the load of tubes from the belt means to an associated rack when the collection of tubes is sufficient to fill the rack.

These and other features of the invention are described in more detail hereafter and illustrated in the accompanying drawings, in which.

Figure 1:
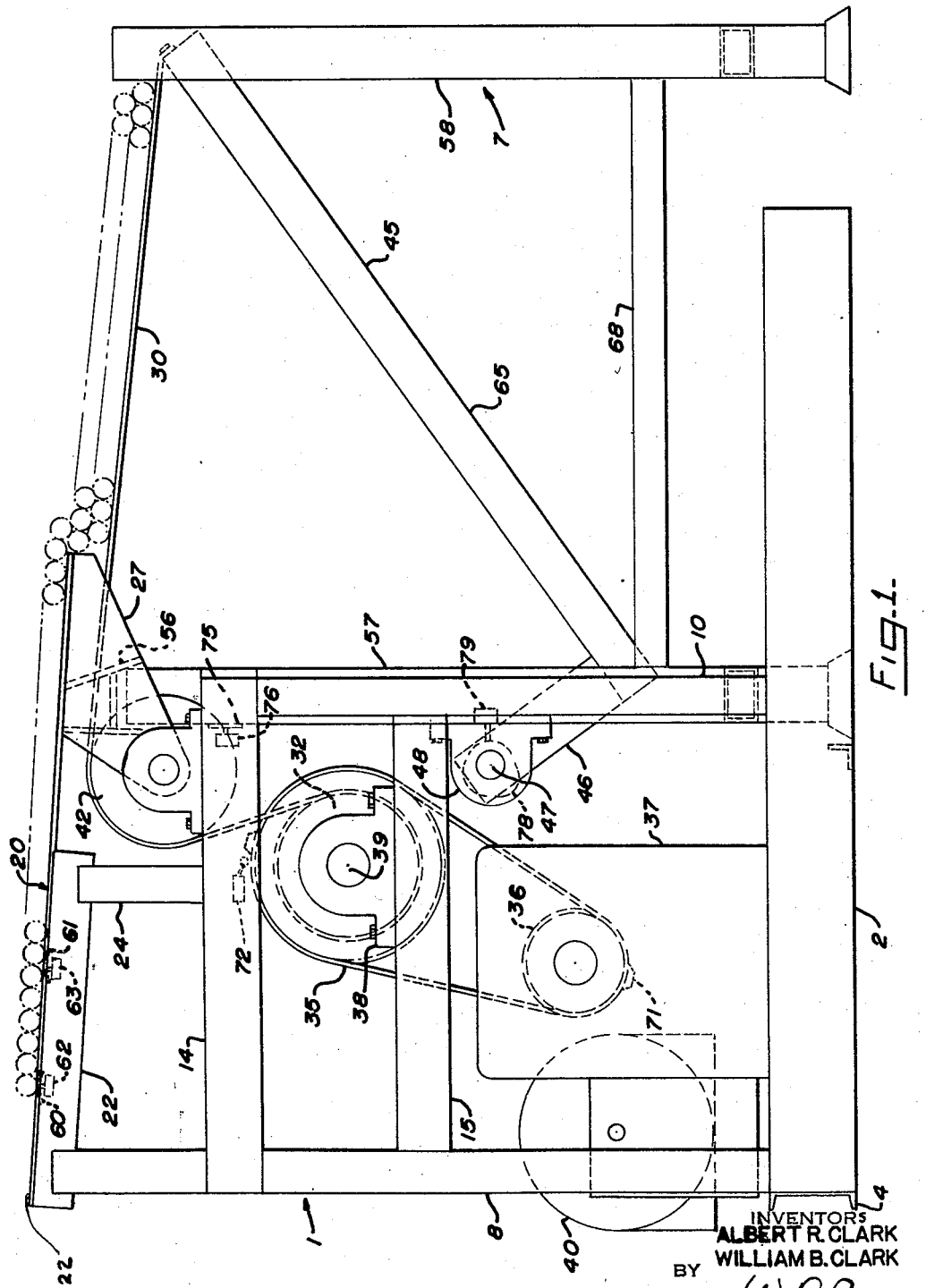
Figure 1 is a side elevation of an apparatus embodying a practical form of the invention.
Figure 2:
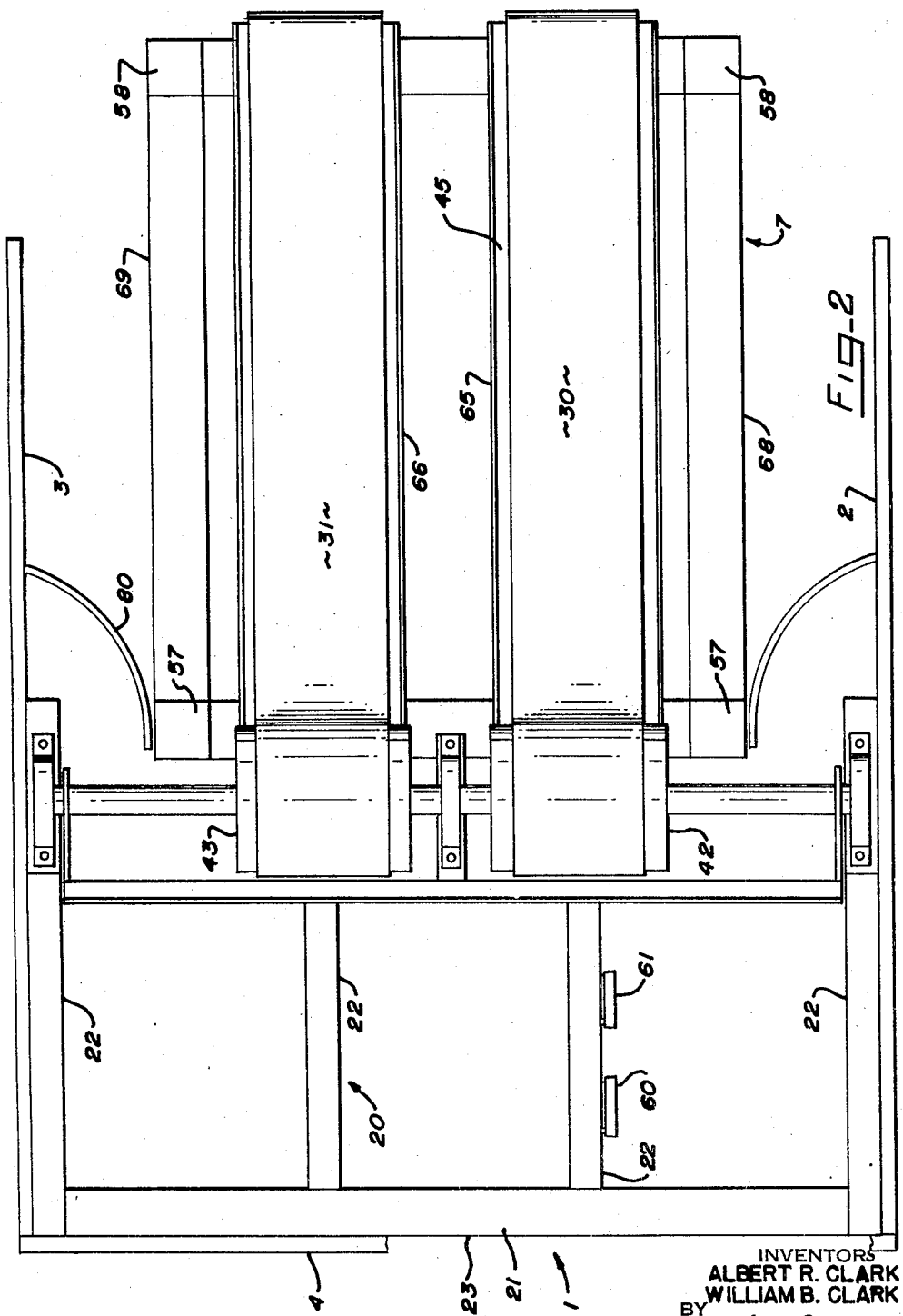
Figure 2 is a plan view of the embodiment of Figure 1.

As illustrated in the drawings, the tube handling apparatus has a frame 1. The base of the frame has side members 2 and 3 formed of U beams positioned on their edges and facing outwardly. The members 2 and 3 are joined at one end by a cross beam 4. The free ends of the members 2 and 3 extend on opposite sides of the loading position of the rack 7 having a design adapted for use with this invention.

The frame 1 has corner posts 8 and 9 rising from the ends of cross beam 4. These may be constructed of heavy angle iron. Extending upwardly from the inner sides of side members 2 and 3 and intermediate of their ends are uprights 10 and 11. The latter are connected to the corner posts 8 and 9 by angle iron cross pieces 14, 15, 16 and 17.

An inclined runway 20 provides a path down which the series of tubes or other elongated articles roll as they are received by the apparatus. The runway has an initial stationary section 21 formed mainly of four longitudinal strips 22 and an integral edge member 23. Section 21 is mounted on stub posts 24 and 25 extending up from angle iron cross pieces 14 and 16.

The terminating portion of the runway 20 is composed of the top of the tiltable rack-locking member 27 when the latter is in its down position as illustrated in Figure 1.

Two fabric belts 30 and 31 are wound on drums 32 and 33. The drums are turned by a chain 35 between sprocket 36 of the gear reducer 37 and sprocket 38 on the drum shaft 39. The chain is driven by motor 40 through the gear reducer 27 and sprocket 36.

The unwound portions of the belts run over idler drums 42 and 43 and are fastened at their ends to the outer edge of pivotable frame 45. The latter is rigidly secured by strap arms 46 to shaft 47 which is rotatably supported in bearings 48. The latter are mounted on the uprights 10 and 11.

Figure 3:
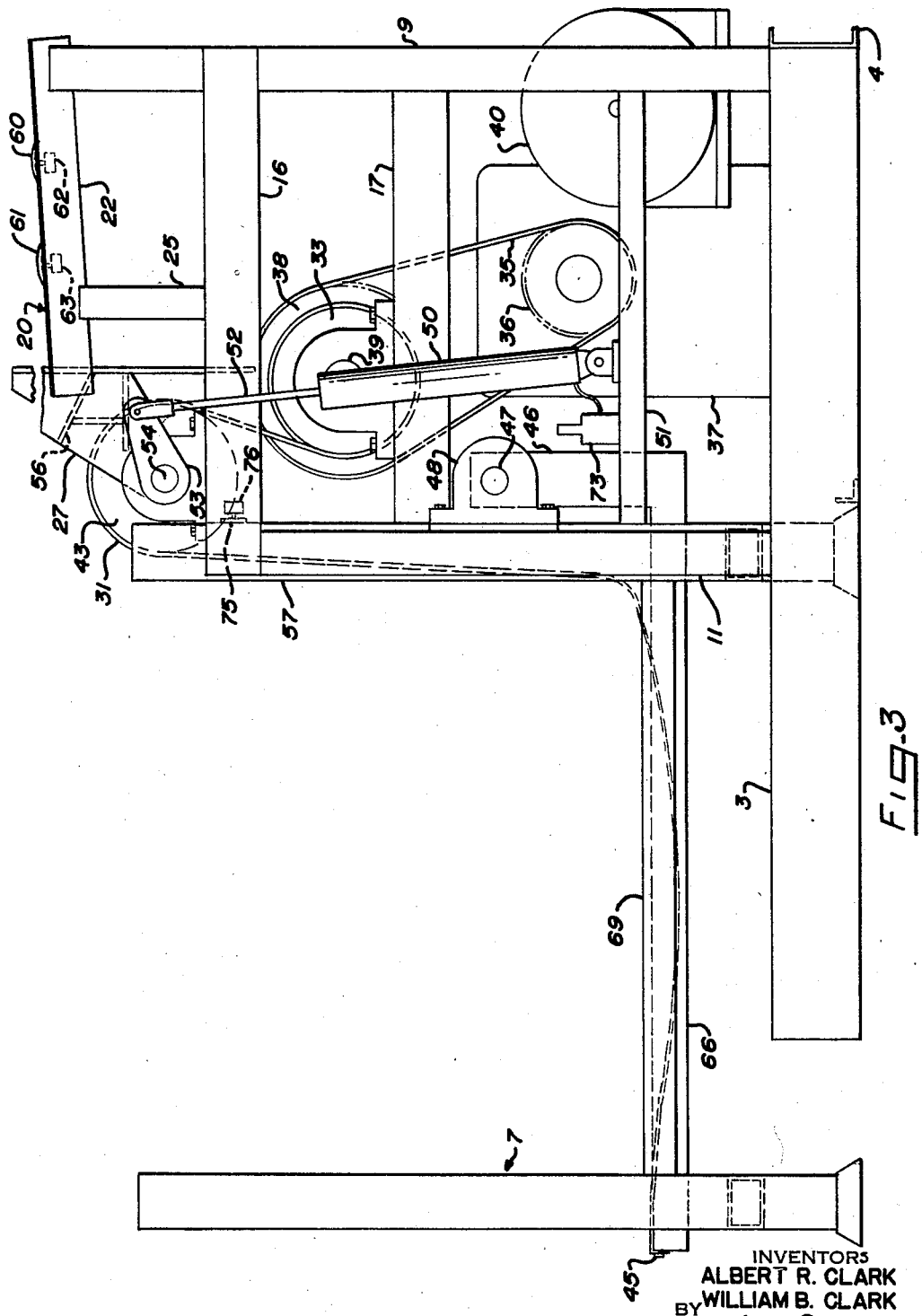
Figure 3 is an elevational view showing the side of the apparatus opposite to that shown in Figure 1.

A fluid driven piston within cylinder 50, mounted on supporting bar 51 as illustrated in Figure 3, is the actuating agent for tilting the rack-locking member 27. The piston rod 52 is linked to the crank arm 53 extending from shaft 54 to which the locking member 27 is fastened.

On the lower side of the locking member 27 near its ends are, downwardly facing, square cups 56 shaped to fit over the upper ends of the inner corner posts 57 of the rack 7 when the locking member is in its lowered position.

Additional structural elements will be referred to in the following explanation of the operation of the apparatus.

The apparatus as pictured in Figure 1 is ready to receive a series of tubes from a delivery source such as a tube cutting machine. A suitable ramp may be utilized to bridge the space from the outlet end of the delivery source to the top of inclined runway 20.

The rack-locking member 27 is in its down position with its upper surface forming the terminating portion of runway 20 and with the cups 56 on its underside gripping the upper ends of the rack posts 57.

The belts 30 and 31 are wound on drums 32 and 33 to where they have raised the outer end of the frame 45 to approximately two inches below the top of the outer corner posts 58 of the rack 7. The belts are drawn taut from frame 45 around idler drums 42 and 43. The exposed sections of the belts are inclined downwardly from the drums 42 and 43 to their ends fastened to the frame 45, said belt sections lying in a plane below and substantially parallel with the plane of the runway.

As the tubes roll down the runway and the belts, they are stopped by abutting the outer rack corner posts 58 extending above the belt level. The accumulating tubes then form a row back across the belts. Depending upon the diameter of the tubes the formation of one or more layers of tubes on the belts then starts a blockage of the tubes in contacting array in a row up the runway. When this row reaches the starting arms 60 and 61 of the series-associated switches 62 and 63, the arms are both depressed by the weight of tubes above them, and motor 40 is actuated to turn drums 32 and 33 in belt unwinding direction. While switch arms extend above the runway and are tripped by each passing tube, the tubes are ordinarily spaced sufficiently apart as discharged from the fabricating machine not to depress both switch arms simultaneously.

As the belts unwind they sag under the weight of the tubes and permit frame 45 to drop downwardly. This lowers the level of the tubes on the belts and allows the tubes blocked on the runway to roll down upon the layer or layers of tubes first collected on the belts. When the switch arms 60 and 61 are released by the renewed travel down the runway of the tubes, the belt unwinding movement of motor 40 is temporarily stopped.

The tubes in their regular spaced sequence from the fabricating machine continue to roll down the runway and drop on the belts until again they become stacked to a height that causes another row to collect back up the runway. The consequential depression of both switch arms restarts motor 40 to drop the belt enough further to permit the free flow of the tubes to be resumed. The motor is again stopped by the release of the switch arms. By many repetitions of this cycle the belts are slowly lowered and the tubes accumulate above them, always having a limited non-injurious distance to drop from the end of the runway upon the growing tier of tubes.

Finally the frame 45 is lowered to a horizontal position with the belts comparatively loose within the channel shaped arms 65 and 66 of the frame. At this stage the arms are slightly below the level of the side bars 68 and 69 of the rack 7 and the load of the tubes is then supported upon these side bars. It may be noted that their connection of frame 45 with shaft 47 through the right angled strap arms 46 permits the pivot point of the frame to be higher and reduces the projection of the frame beyond the rack when the frame is in its lowermost position.

With the arrival of the frame 45 at its horizontal position a tripper element 71 carried on chain 35 actuates a limit switch 72 mounted on frame cross piece 14. Tripping of this switch stops the belt motor 40 and operates solenoid valve 73 to direct fluid to cylinder 50. This retracts piston rod 52 and tilts the rack-locking member 27 upward out of locking contact with rack 7 and into position to block the travel of any additional tubes down the runway into the rack. A lift truck is then employed by an attendant to speedily remove the loaded rack and replace it with an empty one. A pair of curved guide bars 80 fixed to the inner sides of base members 2 and 3 centers the new rack as it is inserted in place so that the square cups 56 on the underside of rack-locking member 27 are above the corner posts 57 of the rack.

The removal of the loaded rack releases button 75 of switch 76 which the adjacent inner rack post 57 depresses when the rack is in tube receiving position. Outward movement of button 75 trips the switch 76 and starts motor 40 in a belt winding-up direction.

The rewinding of the belts continue until they are drawn back to their starting position with the frame 45 raised to its top limit as illustrated in Figure 1. At this point a cam 78 on shaft 47 to which the frame 45 is secured meets and actuates switch 79 to stop motor 40 and also to reverse solenoid valve 73 to cause the rack locking member 27 to pivot back to its down position. This releases the tubes that have collected on the runway 20 behind member 27 in the short interval required to replace the loaded rack and rewind the belts.

The tubes again move down the runway in spaced relation as they are discharged from the associated machine and collect upon the belts until the oncoming tubes are blocked and form a row back over the switch arms 60 and 61. Repeating the sequence of operations previously described the depression switch arm starts motor 40 in a belt unwinding direction.

The continued periodic lowering of the belts is finally terminated when the belts and the belt frame have descended below the side bars 68 of the rack and the rack is filled with tubes. The cycle is then completed by the raising of the locking member 27, replacement of the filled rack with an empty one, and rewinding of the belts. It may be seen that the operation is automatic throughout depending only upon an attendant for removal and replacement of racks.

The apparatus of this invention is a complement to the feeding apparatus forming the subject of our co-pending application, Serial No. 576,063, filed April 4, 1956, now abandoned, in that the two devices together provide tube receiving, transit storage, and delivery means between tube machining and finally to assembly stations.

The feeding apparatus disclosed in the prior application is adapted to unload tubes or like articles from a rack of a design filled by the subject device and to feed them one at a time where utilized.

Belts capable of being raised and lowered while supporting a varying load of tubes are present in both machines. The general function of the belts is the same whether suspended singly or in plural form across the rack between the side posts or placed outside of the rack in a straddling arrangement. The latter placement is desirable for long articles of heavier weight.

While the disclosed embodiment of the invention is a preferred form having automatic controls, an arrangement of manually operated switches and valves is of course feasible and may under some circumstances be more practical.

The runway disclosed is moderately inclined to accommodate stock of a cross section sufficiently round to roll easily. For material of more angular cross section a greater inclination would be required in order to permit articles to slide instead of roll.

Single switches for each step of the cycle of operation are illustrated and would be ordinarily satisfactory. To insure against failure in an individual control switch or device, they may be utilized in duplicate or supplemented by secondary controls. For instance a switch 76 with a contact button 75 may be positioned for actuation by each of the rear posts 57 of the rack 7. Likewise a second tripper element 71 may be placed on chain 35 to trip switch 72 and stop belt wind-up movement of motor 40 should switch 79 fail to function. This would be a precaution against breaking stress on the belts resulting from continued wind up of the belts after they have reached their extreme up position as shown in Figure 1.

It may be seen from the preceding description and explanation that an apparatus has been provided which performs in an efficient manner to accomplish the recited objects and advantages of the invention.

The features which contribute importantly to the attainment of the proposed objects include the belt arrangement with the means for lowering and raising the belts to definite limits, the rack locking member which also serves to hold back delivery of tubes while the loaded rack is replaced by an empty rack, and the control devices governing the cycle of movements of the apparatus.

Although a particular embodiment of the invention has been shown and described, it will be understood that various modifications including those suggested above may be made without departing from the scope of the invention.

What is claimed is:

1. In an apparatus for receiving a continuous succession of utbes or the like and loading them into racks, an inclined runway to which the tubes are delivered, belt means initially extending from below the discharging end of the runway in an inclined plane below and approximately parallel to the plane of the runway, and generally over the location of the rack to be loaded by the apparatus, the outer end of the belt means terminating below the top of the outer corner posts of the rack, whereby tubes rolling down the runway and belt means are stopped by abutment against said corner posts, and means for gradually lowering the belt means as the tubes accumulate thereon, said means comprising a belt means feeding device adding length to the belt means across the rack and a pivotable member to whcih the outer end of the belt means is fixed, and further comprising means gradually turning downwardly the pivotable member to lower the outer end of the belt means until said outer end is below the tube supporting base of the rack, whereby the load of the tubes is transferred from the belt means to the tube supporting base of the rack and the rack may then be moved away from the apparatus without interference from the belt means.

2. An apparatus according to claim 1 having means for blocking any additional tubes from reaching the belt means from the runway after enough tubes have accumulated on the belt means to fill the rack.

3. An apparatus according to claim 1 having means for locking the rack in position below the belt means.

4. An apparatus according to claim 1 having means stopping further lowering of the belt means when enough tubes have accumulated upon the belt means to fill the rack.

5. An apparatus according to claim 1 having a movable means which in one location locks a rack in position below the belt means and in a second location blocks the travel of tubes from the runway to the belt means.

6. An apparatus for receiving a succession of tubes or of like elongated articles, collecting them in a load and transferring the load to a rack of a type having upright corner posts, parallel load supporting bars spaced apart a distance less than the length of the tubes, and feet below the bars; said apparatus including a belt, a drum on which the belt is wound and from which the belt is adapted to be initially extended in a path across the top portion of the rack, a lowerable device holding the outer, terminating end of the belt below the upper ends of the corner posts of the rack, said path being above, but roughly parallel to and between the load supporting bars of the rack, means delivering tubes in succession upon the belt, means for turning the drum and releasing a greater length of the belt as the tubes accumulate thereon, and means adapted to gradually depress the lowerable device holding the terminating end of the belt, as the tubes accumulate on the belt, until the terminating end of the belt is brought down below the level of the load supporting bars of the rack, whereby the tubes are transferred from the belt to the bars, and the rack with the tubes thereon may be drawn away from the apparatus without interference from the belt.

7. An apparatus according to claim 6 in which the means delivering tubes upon the belt includes a runway having a first stationary section and a second pivotable section, said pivotable section forming a portion of the runway when in a down position, a gripping element on the pivotable section locking a rack in its location below the belt when the pivtable section is in its down position, said pivotable section releasing the rack and blocking the flow of tubes from the runway to the belt when in its up position, and means raising the pivotable section from its down to its up position when enough tubes have accumulated upon the belt to fill the rack.

8. An apparatus for receiving a succession of tubes or of like elongated articles, collecting them in a load and transferring the load to a rack of a type having upright corner posts, parallel load supporting bars spaced apart a distance less than the length of the tubes, and feet below the bars; said apparatus including belting, a drum on which the belting is wound and from which the belting is adapted to be initially extended in a path near the top portion of the rack, a lowerable device holding the outer, terminating end of the belting below the upper ends of the corner posts of the rack, said path being above, roughly parallel to and horizontally offset from the load supporting bars of the rack, means delivering tubes in succession upon the belting, means for turning the drum and releasing a greater length of the belting as the tubes accumulate thereon, and means adapted to gradually depress the lowerable device holding the terminating end of the belting, as the tubes accumulate on the belting, until the terminating end of the belting is brought down below the level of the load supporting bars of the rack, whereby the tubes are transferred from the belting to the bars, and the rack with the tubes thereon may be drawn away from the apparatus without interference from the belting.

References Cited in the file of this patent

UNITED STATES PATENTS

| 1,726,139 | Blasco et al. | Aug. 27, 1939 |
| 2,699,264 | Bruce et al. | Jan. 11, 1955 |
| 2,765,599 | Johnson | Oct. 9, 1956 |